United States Patent [19]

Wattron

[11] 4,281,506
[45] Aug. 4, 1981

[54] CONVERTIBLE FORAGE-HANDLING MACHINE

[75] Inventor: Albert Wattron, Schwenheim, France

[73] Assignee: Belrecolt S.A., Marmoutier, France

[21] Appl. No.: 127,231

[22] Filed: Mar. 4, 1980

[30] Foreign Application Priority Data

Mar. 9, 1979 [FR] France .............................. 79 06913

[51] Int. Cl.³ ........................................... A01D 79/00
[52] U.S. Cl. .................................................. 56/370
[58] Field of Search ................. 56/370, 368, 365, 400

[56] References Cited

U.S. PATENT DOCUMENTS 4,059,944  11/1977  Reber ..................................... 56/370

Primary Examiner—Jay N. Eskovitz
Attorney, Agent, or Firm—Ernest F. Marmorek

[57] ABSTRACT

A convertible forage-handling machine which is capable of operating in tedding or windrowing position includes a plurality of bipartite arms mounted on a carrier of a raking wheel for rotation therewith. The two parts of each of the arms are always maintained in the same common plane regardless of the mode in which the machine operates, and are in permanent contact with one another via a motion-transmitting arrangement consisting of cooperating male and female connecting elements. One of the parts is swivelled by the cooperation of a cam follower rigid therewith with a stationary cam track, and the other part, which carries a plurality of forage-engaging tools at its free end, is caused by the motion-transmitting arrangement to share in the swivelling motion only when the machine operates in the windrowing position. The other part is pivotable between an extended position corresponding to the tedding position with the forage-engaging tools at a greater diameter and a retracted position corresponding to the windrowing position with the tools at a smaller diameter. The motion-transmitting elements include a projection of the male element received in a recess of the female element, at a distance from the axis of the other part in the retracted position, and coincidingly with such axis in the extended position.

15 Claims, 8 Drawing Figures

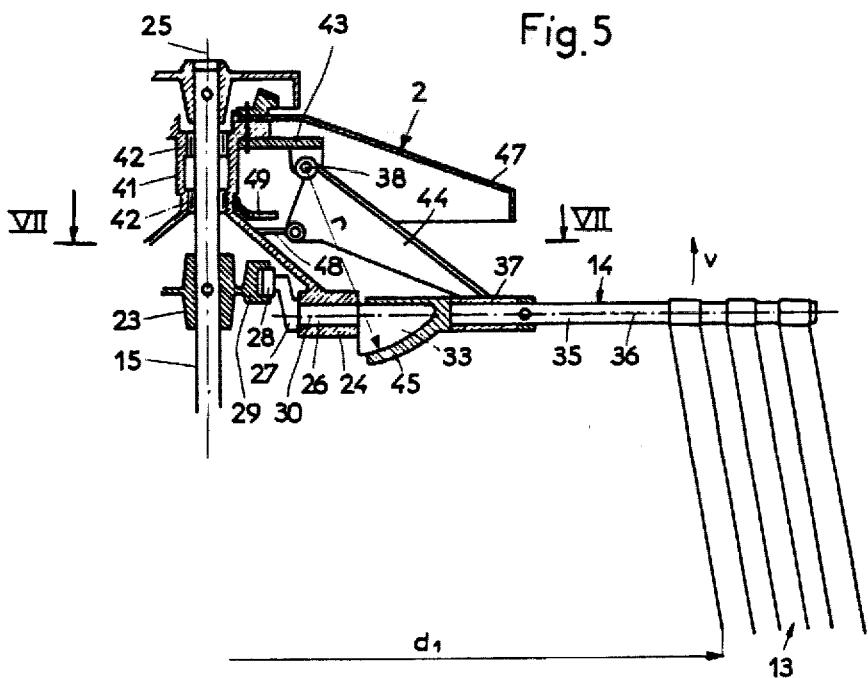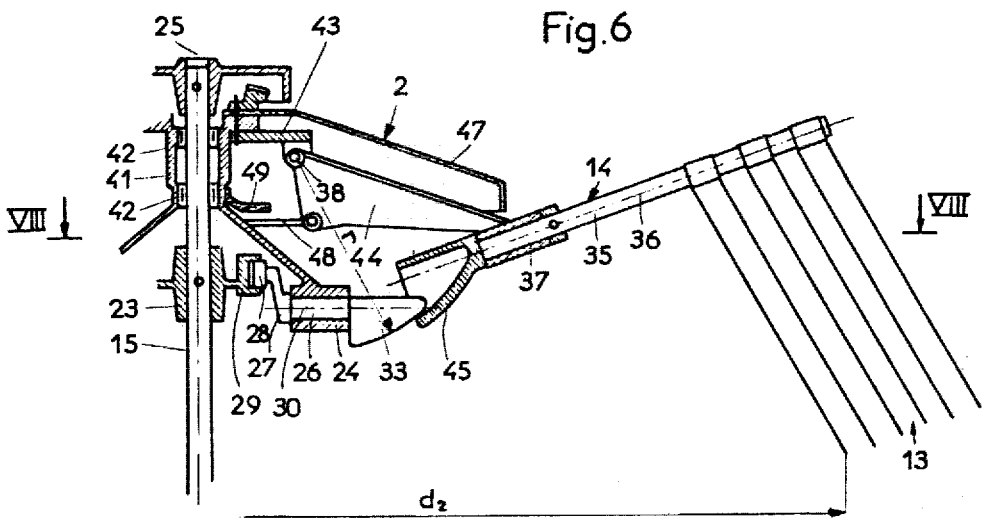

CONVERTIBLE FORAGE-HANDLING MACHINE

BACKGROUND OF THE INVENTION

The present invention relates to a convertible forage-handling machine in general, and more particularly to a machine of this type which is capable of being converted for performing a tedding operation, on the one hand, and for forming swaths of forage, on the other hand.

There is already known a variety of machines of the type here under consideration, each of which includes at least one raking wheel which rotates about its axis and which includes a plurality of tool-carrying arms that extend outwardly from the axis of rotation and orbit the latter in the course of rotation of the raking wheel. These arms carry at their ends which are remote from the axis of the raking wheel a plurality of forage-engaging tools or tines capable of gathering or transporting forage, such as hay, as the raking wheel rotates. Usually, that end of the respective arm which is close to the axis of rotation of the raking wheel is equipped with a crank which carries a roller follower that traces a cam track of a cam member which is stationarily mounted on the machine. The configuration of the cam track, which may be shaped as a guiding groove, is so selected that the respective tool-carrying arm is swivelled back and fourth about its longitudinal axis at certain points of the trajectory of its orbiting movement about the axis of the raking wheel to lift the forage-engaging tools off the ground and to subsequently return such tools to their original positions to engage additional quantities of forage, when the machine operates in its windrowing position. This swivelling motion of the arms, which results in a periodical lifting of the forage-engaging tools off the ground, results in the deposition of the forage in respective swaths.

When a machine of this type, which usually has more than one of the raking wheels, is to be converted from the windrowing position to the tedding position, the swivelling motion of the arms, which results in periodical lifting of the forage-engagement elements at certain points of their orbiting trajectories, must be discontinued so that the forage-engaging tools remain in their positions of substantial perpendicularity to the ground at the front of the machine as seen in the advancement direction of the latter. It is also advantageous, for operating in the tedding position, to increase the range of operation of the forage-engaging teeth in the radial direction of the raking wheel, as compared to the radius along which the forage-engaging teeth travel during the operation in the windrowing position.

To achieve these purposes, there has been proposed a machine of the type here under consideration in which each of the tool-carrying arms consists of two parts. In this conventional machine, these two parts of each of the arms are connected with one another when the machine is to perform in the windrowing position, while they are separated from each other for operation in the tedding position. This function has the disadvantage that a ball of hay or other forage will form between the two parts of each of the arms. Furthermore, each of the arms is to be equipped with a separate device for connecting the two parts of each of the arms for joint rotation when the machine is operating in the windrowing position. Since each of the arms is equipped with its own connecting device so that each of the connecting devices has to be adjusted for changing from the tedding position to the windrowing position and vice versa, it will be appreciated that a substantial amount of time is spent on this change from one mode of operation to the other. The amount of time spent in this converting operation is further extended by the fact that, at least during the change from the tedding position to the windrowing position, it is necessary to clear the ends of the two parts of each of the arms which face one another of any hay or other forage which may have beconme accumulated or deposited thereon, in order to be able to cause the connecting means to interconnect the two parts of each of the arms.

Furthermore, there are known other machines of this type wherein each of the arms again consists of two parts which, however, are always in contact with one another, whether the machine is to be operated in the tedding position or in the windrowing position. A particular advantage of this construction of the forage-handling machine of this type is that it is not necessary to provide the connecting device of the above-discussed type. However, this machine is also disadvantageous in several respects. So, for instance, it is impossible to change the radial distance at which the forage-engaging elements or tools orbit the axis of the raking wheel when changing from one of the modes of operation to the other. This, of course, is disadvantageous, particularly in view of the fact that, in order to obtain efficient tedding, it is necessary to reduce the distance between two adjoining raking wheels so as to preferably obtain interpenetration or interleaving of the arms or forage-engaging tools or elements as they orbit about the axes of the corresponding raking wheels. This need for providing for the adjustment of the distance between the individual raking wheels renders the construction of this machine very complex and, consequently, prone to malfunction.

Another conventional machine of this type where the arms of the raking wheel each also consist of two parts, is so constructed as to render it possible to increase the diameter of orbiting motion of the forage-engaging teeth about the axes of the respective raking wheels when converting from the windrowing position to the tedding position. This machine is equipped with a latching device which latches the arms of each raking wheel against rotation when such arms assume their extended positions corresponding to the tedding position. This machine employs a multitude of universal joints for interconnecting the parts of the individual arms; hence, this machine is rather sensitive to soiling and resulting damage. In addition thereto, it is necessary in this machine to move the outer parts of each arm between their extended and retracted positions from one plane in another. This, of course, is very disadvantageous.

SUMMARY OF THE INVENTION

Accordingly, it is a general object of the present invention to avoid the disadvantages of the prior art.

More particularly, it is an object of the present invention to provide a convertible forage-treating machine of the type here under consideration which is not possessed of the disadvantages of the prior-art machines of this type.

A further object of the present invention is to so construct the forage-treating machine as to be rather rugged, not require machining to any precise tolerances, and to be able to withstand the rather harsh conditions encountered in the argicultural field.

A concomitant object of the present invention is to so design the machine as to be able to perform in a windrowing position, on the one hand, and in a tedding position, on the other hand, and that the radius of the orbiting movement of the forage-engaging elements can be adjusted from smaller for the operation in the swath-forming mode, to larger for operation in the harvesting mode.

Other objects of the invention will in part be obvious and will in part appear hereinafter.

With the above and other objects of the invention in view, the invention consists in a convertible forage-handling machine of the type capable of operating in tedding position or windrowing position, which machine comprises a support; at least one carrier mounted on the support for rotation about an axis; a plurality of arms mounted on the carrier for rotation therewith and extending outwardly of the axis, each of the arms including two elongated parts extending along a common plane and each mounted on the carrier at least for swivelling about its longitudinal axis; means for imparting swivelling motion to one of the parts about its longitudinal axis, including a cam member stationarily mounted on the support and having a cam track, and a cam follower rigidly connected to the one part of each of the arms and tracing the cam track as the carrier rotates about the axis of the latter; a plurality of forage-engaging elements attached to the other of the parts of each of the arms; means for mounting the other part of each of the arms on the carrier for displacement between a retracted position corresponding to the windrowing position, in which the forage engaging elements are spaced a first distance from the axis of the carrier, and an extended position corresponding to the tedding position in which the forage-engaging elements are spaced a greater second distance from the axis of the carrier; and cooperating motion-transmitting elements rigid with the parts of each of the arms and in constant contact with one another in and intermediate the retracted and extended positions of the other part of each of the arms and operative for transmitting the swivelling motion of the one part to the other part only in the retracted position of the other part to lift the forage-engaging elements thereof out of engagement with the previously gathered forage at one point of the the orbiting trajectory of the forage-engaging elements about the axis of the carrier and to subsequently lower the forage-engagement elements in contact with additional forage at another point of the orbiting trajectory of the forage-engagement elements.

The above-discussed construction of the machine according to the invention has the advantage that, in the two modes of operation, the two parts of each arm are constantly situated in the same plane and in permanent engagement with one another by means of the motion-transmitting elements rigid therewith, which motion-transmitting elements transmit the swivelling motion of the one part whose cam follower traces the undulations of the cam track of the stationary cam member, to the other part of the respective arm when operating in the windrowing position, while assuring that the forage-engaging elements mounted on the other part remain in their positions in which they extend substantially in a plane extending perpendicular to the ground and substantially parallel to the axis of rotation of the respective raking wheel, when the machine operates in the tedding position. Another advantage of this construction is that, in the extended position assumed for operating in the tedding position, the forage-engaging elements or tools orbit the axis of the respective raking wheel at a distance exceeding that at which these tools orbit the axis of the raking wheel when the other parts of the arms assume the retracted positions corresponding to the windrowing position of the machine.

According to an advantageous concept of the present invention, the common plane along which the two parts of each of the arms extend both for the operation in the tedding position and windrowing position, is advantageously parallel to the axis of the raking wheel and, advantageously, this plane may include the axis of the raking wheel. It is further advantageous when the motion-transmitting elements include a female connecting element rigid with a first of the parts and having an elongated recess, and a male connecting element rigid with a second of the parts and having a projection received in the recess. When this expedient is resorted to, it is assured that the projection will always be at least partially received in and in engagement with the recess of the female connecting element which is rigidly mounted on or integral with the first one of the two parts. It is further advantageous when the projection is offset from the longitudinal axis of the second part of the respective arm and when the projection is shaped as a body of revolution, particularly as a roller.

As mentioned before, the respective two parts of each of the arms remain permanently in or along the common plane. However, the mounting means for the other part of each of the arms preferably includes means for mounting the other parts of all of the arms on the carrier for pivoting about pivoting axes located in a plane substantially normal to the axis of the carrier.

The result of this arrangement is that, when the two parts of the respective arm are situated coaxially with one another, the motion-transmitting means transmits the swivelling motion of the one part to the other part of the respective arm. Thus, the forage-engaging elements of the other part are moved rearwardly as considered in the direction of rotation of the respective raking wheel to become lifted off the ground and to release the previously gathered forage, at a certain point of the orbiting trajectory of the forage-engaging tools, so that the released quantities of the forage will form a swath. After releasing the accumulated quantities of forage, the other part of the respective arm is swivelled back to its original position in which the forage-engaging tools extend toward the ground and gather additional quantities of the forage.

On the other hand, when the other part of the respective arm assumes its extended position corresponding to the tedding position, after the axis of rotation of each raking wheel has been slightly displaced in a forward direction and after the parts of each of the arms have been displaced relative to one another such that they enclose an angle of less than 180°, particularly by pivoting the respective other part of the arm about an axis which is situated in the plane that is perpendicular to the axis of rotation of the respective raking wheel, the projection of the male connecting element which is rigid with the second of the part still remains accommodated in the recess of the female connecting element which is connected to the first one of the parts. The recess is so configurated that, when the other part of the respective arm assumes its extended position, the swivelling motion of the respective one part of the same arm is not transmitted to the other part. As a matter of fact, the cooperation of the projection of the male connecting element with the recess of the female connecting element is such that the other part of the respective arm is held in its extended position in which the forage-engaging elements or tools again extend in planes substantially parallel to the axis of rotation of the respective raking wheel over the entire trajectory of orbiting movement of the forage-engaging elements about the axis of the respective raking wheel.

The invention accordingly comprises the features of construction, combination of elements and arrangement of parts which will be exemplified in the construction hereinafter set forth in the scope of application of which will be indicated in the claims.

BRIEF DESCRIPTION OF THE DRAWINGS

FIG. 5 is a view similar to FIG. 3 but of a raking wheel incorporating a different embodiment of the motion-transmitting arrangement;

FIG. 6 is a view similar to FIG. 5 but taken on a line IV—IV of FIG. 2;

DETAILED DESCRIPTION OF THE PREFERRED EMBODIMENTS

Figure 1:
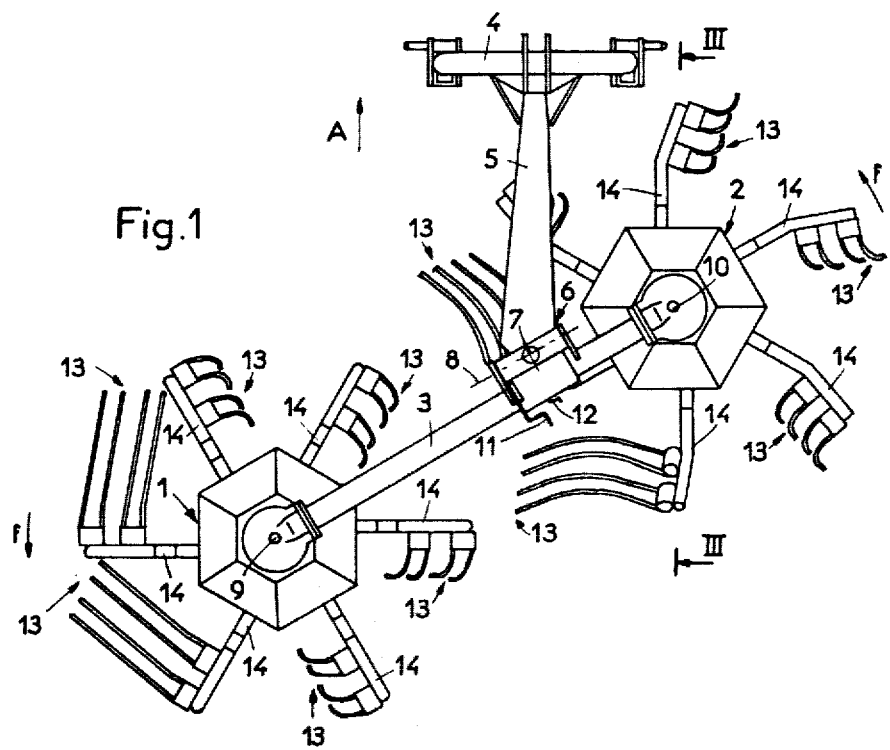
FIG. 1 is a top plan view of a machine according to the present invention in a position assumed for operating in a windrowing position.
Figure 2:
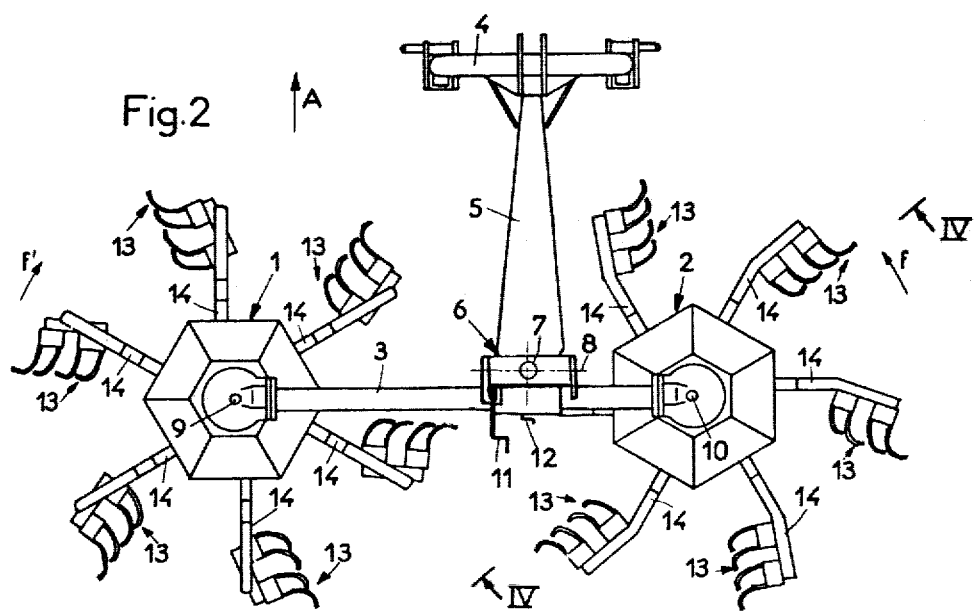
FIG. 2 is a view similar to FIG. 1 but showing the machine in a position assumed for performing in a tedding position.

Referring now to the drawings in detail, and first to FIGS. 1 and 2 thereof, it may be seen that the machine according to the present invention includes two raking wheels 1 and 2 which are mounted on and interconnected by a support beam 3. The machine or agricultural implement of the present invention may be connected to a non-illustrated tractor, by means of attaching devices which are mounted on a frame 4 located at the front part of the machine as seen in the advancement direction A of the machine. An additional beam 5 connects the frame 4 to the transverse beam 3. A mechanism 6 of a conventional construction is interposed between the beam 5 and the transverse beam 3 and connects the beams 3 and 5 to one another for angular displacement of the transverse beam 3 relative to the beam 5, about a vertical axis 7, on the one hand, as well as about a horizontal axis 8, on the other hand. The mechanism 6 renders it possible to position the beam 3 with respect to the beam 5 in such a manner that it encloses an angle different from 90° with the beam 5, as shown in FIG. 1 wherein the axes 9 and 10 of the raking wheels 1 and 2 are substantially perpendicular to the ground, for operation in the windrowing position, or that it forms an angle of 90° with the beam 5, as shown in FIG. 2, in which case the axes 9 and 10 of the raking wheels 1 and 2 are slightly inclined downwardly and frontwardly so that the machine can operate in the tedding position. The inclination of the axes 9 and 10 of the raking wheels 1 and 2 is obtained by actuating a crank 11. Furthermore, the conversion from the windrowing position to the tedding position requires the reversal of the direction of rotation of the raking wheel 1. This is necessary since, in the windrowing position, both wheels 1 and 2 rotate in the same direction f while these wheels 1 and 2 have to rotate in opposite senses f and f' during the operation in the tedding position. This change of rotational direction of the raking wheel 1 is achieved by actuating another crank 12. A further operation which is still to be attended to during the conversion from the windrowing position to the tedding position is the reversal of the positions of the forage-engaging tools or elements 13 of the raking wheel 1 such that the tools 13 are curved forwardly as considered in the direction of rotation f' of this raking wheel 1 during the operation in the tedding position. Of course, when it is desired to convert the machine from the operation in the tedding position to the operation in the windrowing position, the same steps will have to be taken, but in reverse.

Figure 3:
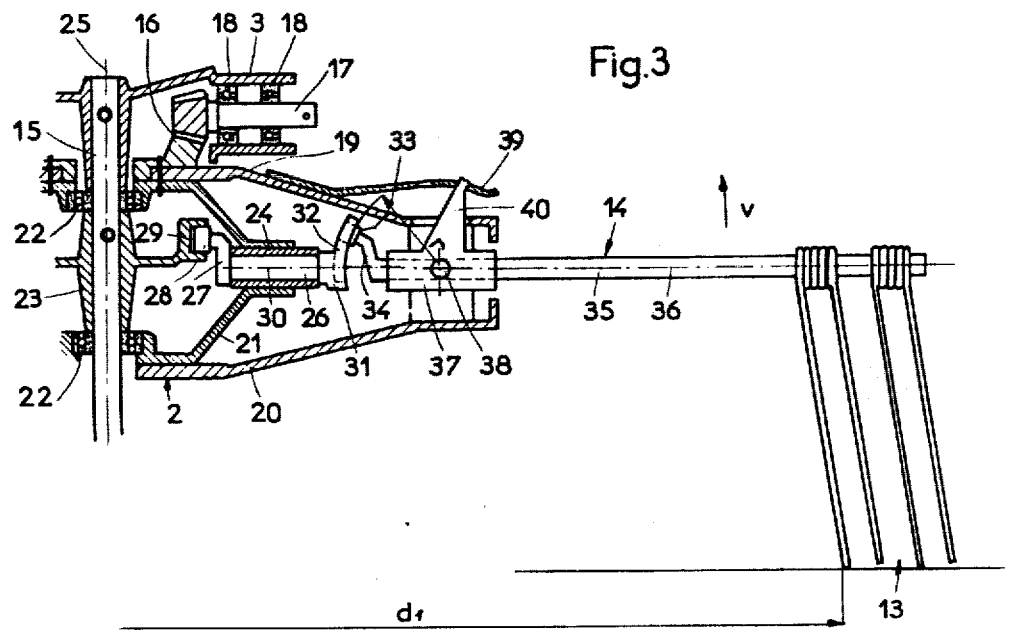
FIG. 3 is a cross-sectional view taken on line III—III of FIG. 1 through a raking wheel incorporating a first embodiment of the motion-transmitting arrangement of the present invention.
Figure 4:
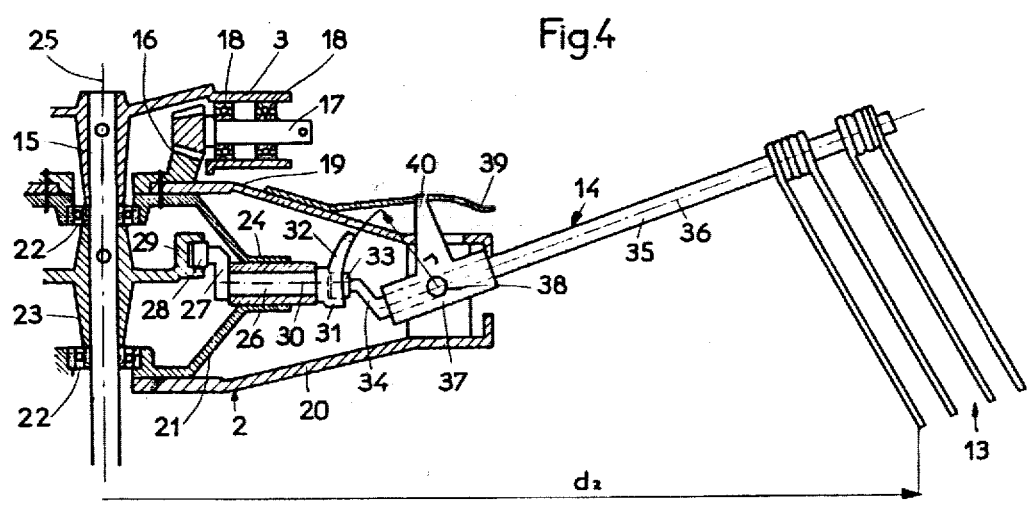
FIG. 4 is a view similar to FIG. 3 but taken on line IV—IV of FIG. 2.
Figure 7:
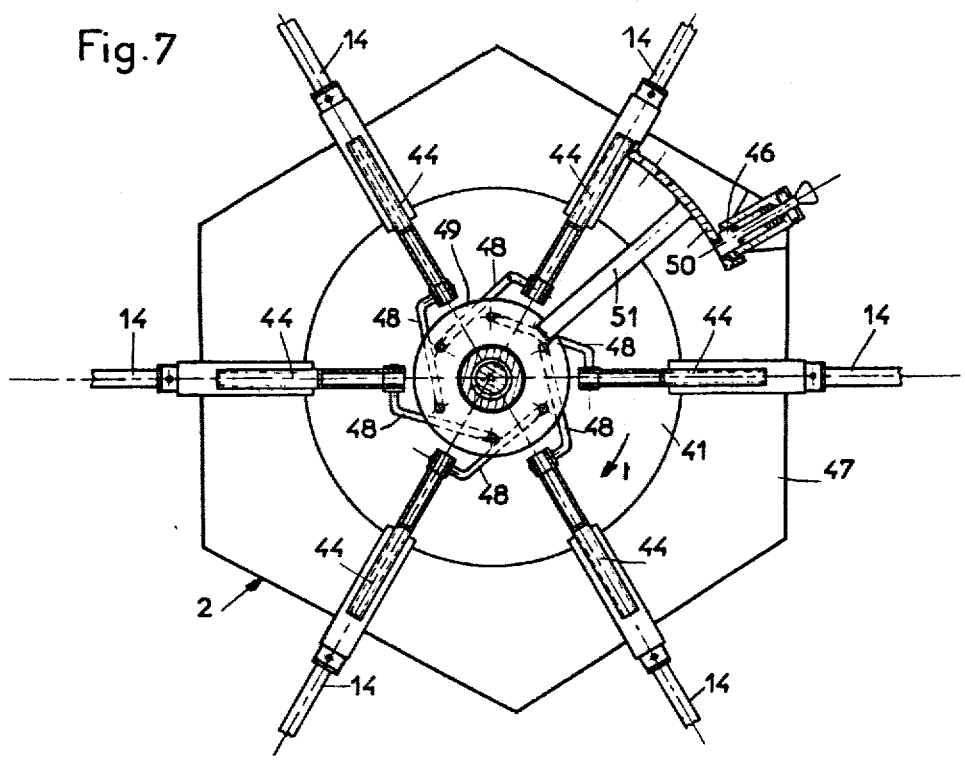
FIG. 7 is a sectional view taken on line VII—VII of FIG. 5.
Figure 8:
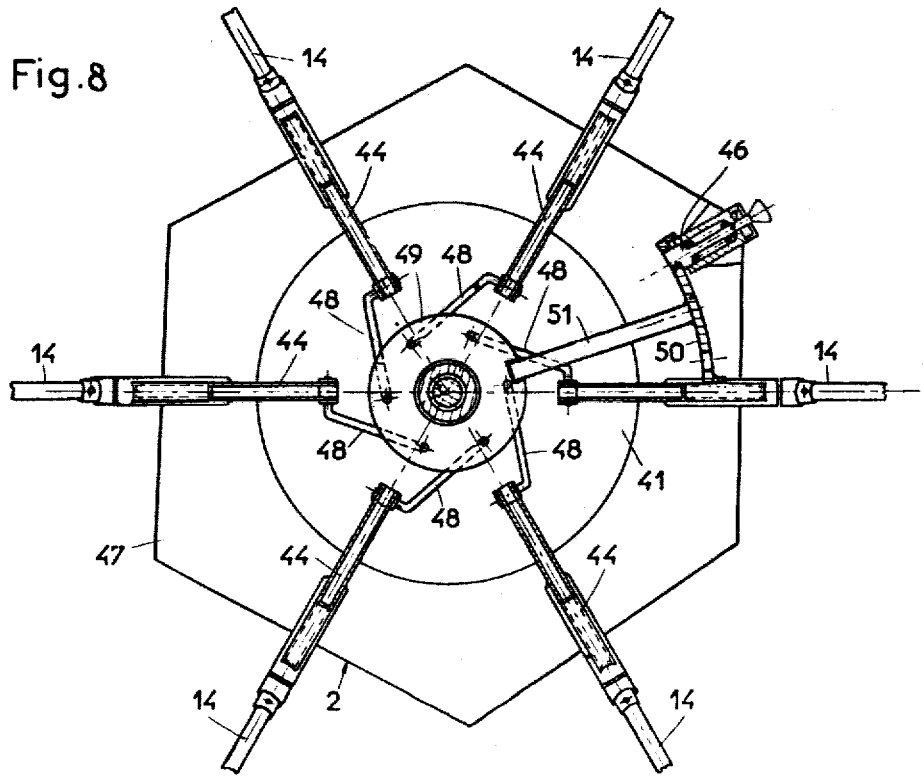
FIG. 8 is a view similar to FIG. 7 but taken on line VIII—VIII of FIG. 6.

Turning now to FIGS. 3 and 4, it may be seen that each of them illustrates a first embodiment of the motion-transmitting means of the present invention in a cross-sectional representation of a single arm 14, together with the associated driving and controlling mechanisms. While these drawings illustrate the conditions existing at the raking wheel 2, it is to be understood that the construction will be the same for each of the arms 14 of the raking wheel 1.

As shown in FIGS. 3 and 4, the raking wheel 2 is mounted on a rigid and stationary support 15 which, in turn, may be connected to a wheel or a similar rolling element which engages the ground. The raking wheel 2 is rotated about this support 15 by means of a set of cooperating bevel gears 16 including a pinion which is mounted on a shaft 17 supported on roller bearings 18 and extending into the transverse beam 3, the shaft 17, in turn, being rotated by non-illustrated transmitting elements which may be accommodated in the interior of the beam 5 and connected to an implement-driving output shaft of the tractor. The crown wheel of the bevel gear transmission 16 is mounted on an upper portion 19 of a housing which also includes a lower part 20. These two parts 19 and 20 cooperate with one another to shield or protect the parts which are accommodated within this housing. The crown gear of the bevel gear transmission 16, as well as the parts 19 and 20 of the housing, are connected to an internal casing 21 which is rotatably supported on the support 15 by means of roller bearings 22. A stationary circular cam 23 is accommodated in the interior of the casing 21, the cam 23 being affixed to the support 15. The casing 21 supports a plurality of bearings or guideways 24 each of which extends radially outwardly in a plane substantially perpendicular to the axis 25 of the support 15.

A part 26 of each of the arms 14 is supported in the respective guideway or bearing 24. This part 26 of the respective arm 14 is provided, at its end which is closest to the support 15, with a control crank 27 carrying disk-shaped cam follower 28. This roller 28 cooperates with a cam track 29, such as a guiding groove, which has an undulating configuration. In the course of the rotation of the raking wheel, the control crank 27 is angularly displaced by the cam track 29 about the axis of the part 26 of the respective arm 14, so that this part 26 swivels about its axis 30. The part 26 is further provided, at its end which is remote from the control crank 27, with a female connecting element 31 which extends substantially normal to the axis 30. This connecting element includes a socket 32 having an elongated shape and extending outwardly from the axis 30 of the part 26. The socket 32 defines an elongated recess or slot which receives a roller 33 which forms an eccentric projection or a male connecting element 32 that is rigidly mounted on or integral with the other part 35 of the arm 14. The roller or a similar follower 33 is also eccentric with respect to the longitudinal axis 36 of the part 35 in the position of the part 35 that is illustrated in FIG. 3, that is, the retracted position corresponding to the windrowing position.

The part 35 of the respective arm 14 is mounted in a bearing 37 which is mounted on the housing 19, 20 for pivoting about an axis 38. As illustrated in FIGS. 3 and 4, the axis 38 is arranged between the ends of the part 35 of each arm 14. However, it will be appreciated that, without departing from the invention, the pivoting axis 38 may as well support the part 35 on the internal casing 21, in which case the axis 38 will be positioned between the ends of the part 26. The axes 38 of all of the arms 14 advantageously are located in the same plane that is substantially perpendicular to the axis 25 of the support 15.

The arrangement of FIGS. 3 and 4 operates in the following manner.

When the machine is adjusted for operating in the windrowing position, as indicated in FIGS. 1 and 3, and when the raking wheels 1 and 2 turn in the direction of the arrows f, the control cranks 27 which follow the respective undulating cam tracks 29 cause the part 26 of each of the arms 14 to oscillate, which results in angular displacement of the female connecting element 31. Thus, the follower or roller 33 which is received in the sockets 32 of the female connecting element 31 is similarly angularly displaced about the axis of the part 35 of the same bipartite arm 14, so that this other part 35 oscillates as well about its axis, and with it the tools 13 which are mounted at the free end of this part 35. In this retracted position of the part 35, the axis 36 of this part 35 is parallel to and preferably coinciding with the axis 30 of the part 26 of the same arm 14. As a result of the swivelling movement of the part 35, opposite to the direction f of rotation of the respective raking wheel 1 and 2, the forage-engaging elements 13 are lifted off the ground as the disk-shaped roller 28 is moved out of the position illustrated in FIG. 3. Of course, when the guide track 29 returns the disk-shaped roller 28 into its illustrated position, the forage-engaging tools or elements 13 are returned to their original positions as well.

When it is desired to change the mode of operation of the machine from the windrowing position to the tedding position, the position of the raking wheels 1 and 2 with respect to the beam 5 is adjusted and then the part 35 of each arm 14 is moved upwardly about the pivoting axis 38 in the direction of the arrow V of FIG. 3. To be able to achieve this pivoting of the outer part 35, a latching brace 39 is lifted out of engagement with a latch 40. Thereafter, the outer part 35 of the arm 14 is lifted and the latching brace 39 is engaged with the latch 40 in a position illustrated in FIG. 3 wherein the part 35 which is equipped with the forage-engaging elements 13 encloses an angle of less than 180° with the axis 30 of the part 26 that is provided with the control crank 27. This is the only change which has to be made with respect to the positions of the two parts 26 and 35 of each arm 14, while the two parts 26 and 35 always remain in the same common plane which is substantially parallel to the axis 25 of the respective support 15 about which the respective raking wheel 1 and 2 rotates. Moreover, the parts 26 and 35 always remain in contact with one another via the motion-transmitting elements. In this manner, there are avoided those of the above-mentioned problems with respect to relatching, which are encountered in machines equipped with bipartite arms which are disconnected from one another for performing the tedding operation.

As the raking wheel 2 rotates, the part 26 of each tool-carrying arm 14 swivels in the same manner as discussed before in connection with the description of the windrowing position of the machine. However, in the extended position of the part 35 which is assumed during the tedding operation, after pivoting the part 35 of the arm 14 about the pivoting axis 38, the roller or follower 33 is now located at the axis 30 of the part 26. Inasmuch as the roller 33 is constructed as a body of revolution, such as a disk, the alternative swivelling of the part 26 about its axis 30 is not transmitted to the roller 33, so that the part 35 which is provided with the forage-engaging elements 13 remains immovable with respect to the port 26. Consequently, it is advantageous when the direction in which the respective roller 33 extends intersects the pivoting axis 38 about which the part 35 provided with the elements 13 pivots. Furthermore, due to the fact that the roller 33 is eccentric with respect to or offset from the longitudinal axis 36 of the part 35, the roller 33 retains the part 35 in its extended position and prevents the same from turning in its bearing 37.

Moreover, as a result of the fact that the part 35 of each of the arms 14 has been pivoted about the pivoting axis 38, the diameter or reach of the forage-engaging elements 13 has been enlarged. In view of the fact that the diameter $d_2$ for the tedding operation exceeds the diameter $d_1$ for the windrowing operation, the hay or other forage becomes well aerated, because it is intermixed by the elements 13 which move closer to one another during the tedding than during the windrowing operation.

In the exemplary embodiment illustrated in FIGS. 3 and 4, it is advantageous when the female connecting elements 31 of each part 26 of the respective arm 14 are curved having a radius r corresponding to the distance between the pivoting axis 38 of the part 35 and the zones at which the two ends of the two parts 26 and 35 of the same arm 14 face one another.

FIGS. 5-8 illustrate a modified embodiment of the present invention. In this modification, the bevel gear coupling 16, of which only the crown gear is shown, transmits rotational movement to a carrier 41 which is rotatably mounted on roller bearings 42 which surround the support 15. The carrier 41 includes, on the one hand, guideways or bearings 24 for each of the parts 26 which are equipped with the respective control cranks 27 and, on the other hand, a disk 43 on which there are supported, by means of the pivoting axes 38, respective brackets 44 which carry respective guideways or bearings 37 for the respective parts 35 carrying the forage-engaging tools 13. In contradistinction to the variation discussed above in connection with FIGS. 3 and 4, the pivoting axes 38 for the parts 35 in this modified embodiment are situated upwardly of the plane defined by the inner parts 26. Also, each of the pivoting axes 38 is arranged intermediate the ends of the respectively associated part 26. According to the present invention, it is proposed to arrange the axes 38 as close to the periphery as possible. This is so inasmuch as the difference between the diameters d1 and d2 is at its greatest and interpenetration or interleaving of the paths of the arms 14 can be achieved under these circumstances, which improves the mixing of the forage and more effective aeration thereof.

Each of the parts 26 is again provided with a projection 33 which, however, is here of a substantially triangular shape terminating in a spherical free end portion. The projection 33 cooperates with a socket 45 having a complementary shape, the socket 45 being connected to or rigid with the respectively associated part 35 of the respective arm 14.

As the raking wheels 1 and 2 rotate about their axes 25, the parts 26 of the arms 14 are forced to perform a swivelling motion back and forth about their axes 30. In the position illustrated in FIG. 5 which corresponds to the swath-forming mode of operation, the projection 33 of the part 26 engages the sockets 45 rigid with the part 35 of the arm 14 at the bottom, so that the swivelling motion of the part 26 is transmitted to the part 35, as a result of which the forage-engaging elements 13 are periodically lifted from the ground and returned to their original position as the cam track 29 causes the disk-shaped roller 28 to become angularly displaced about the axis 30 of the part 26.

When it is desired to convert the machine for use in tedding hay or other forage, the arms 14 are to be pivoted about the pivot axis 38 into their extended positions indicated in FIG. 6. This can be done simultaneously for all of the arms 14, as will be explained below. In the extended positions of FIG. 6, the axis 36 of the respective part 35 which carries the forage engaging elements 13 encloses an angle smaller than 180° with the axis 30 of the corresponding part 26 which is equipped with the control crank 27. Here again, the two parts 26 and 35 of the respective arm 14 will remain in the same common plane and in contact with one another via the motion-transmitting element when the machine operates in any one of the two modes. The possibility of simultaneously displacing the part 35 of the arms 14 is advantageous as compared to the embodiment of FIGS. 3 and 4 in which the position of each of the arms 14 has to be adjusted separately in order to change between the extended and retracted positions of the individual parts 35.

The simultaneous conversion or adjustment from the swath-forming mode to the harvesting mode is affected by centrifugal force. For this to happen, it is sufficient to disengage a latch 46 which is mounted on a protective cover or sheath 47 that covers the adjusting mechanism of the arms 14. Upon this release of the latch 46, the centrifugal force attending the rotation of the raking wheels 1 and 2 causes the parts 35 of the respective arms 14 to pivot in the direction of the arrow v. Each of the parts 35 of the respective raking wheel 1 and 2 is connected to respective bracket 48 which is articulated to a disk 49 which rotates in the direction of the arrow t shown in FIG. 7. Upon rotation of the disk 49, the latch 46 may again become engaged with a base plate 50 which is connected to the disk 49 by a bracket 51, upon which all of the parts 35 are locked in their tedding or extended positions shown in FIGS. 6 and 8.

When the parts 35 of the arms 14 have assumed these extended positions, the socket 45 of each of the parts 35 has become only partially disengaged from the projection 33, so that the preferably spherical end portion thereof remains engaged in the recess of the socket 45. As a result of this, the respective part 35 is prevented from swivelling with the part 26, and the respective arm 35 is held in the extended position of FIG. 6 in which the forage-engaging elements are located in planes substantially parallel to the exis 25 of the raking wheels 1 and 2 over the entire trajectory of orbiting movement of these elements 13 about the axis 25.

When it is desired to switch the machine of the present invention from its tedding position to its windrowing position, it is sufficient to release the latch 46 and to push against the part 31 of one of the arms 14. Thus, this part 35 will pivot about its axis 38 which, in turn, will cause the disk 49 to turn about the axis 25. As the disk 49 rotates or turns opposite to the direction of the arrow t, all other parts 35 of the remaining arms 14 will pivot downwardly toward their retracted positions, until the latch 46 again engages the base plate 50 which is connected to the disk 49 by the bracket 51.

An important characteristic feature of the present invention resides in the fact that the motion-transmitting means 31, 32, 33, 34 and 45 is operative for causing the forage-engaging elements 13 to be lifted and returned when the machine operates in its windrowing position for immobilizing such forage-engaging elements 13 when the machine operates in its tedding position, these means 31, 32, 33, 34 and 45 being accommodated either between the upper part 19 and the lower part 20 of the composite housing, or underneath the sheath 47. In this manner, the motion-transmitting means 31-34 and 45 are protected from becoming soiled, and hay or other forage is prevented from reaching and interfering with the operation of the motion-transmitting means 31-34 and 45, for instance, by being wound around the same.

I wish it to be understood that I do not desire to be limited to the exact details of construction shown and described, for obvious modifications will occur to a person skilled in the art.

Having described the invention, what I claim as new and desire to be protected by Letters Patent is as follows:

1. A convertible forage-handling machine of the type capable of operating in tedding or in windrowing position, comprising a support; at least one carrier mounted on said support for rotation about an axis; a plurality of arms mounted on said carrier for rotation therewith and extending outwardly of said axis, each of said arms including two elongated parts each mounted on said carrier at least for swivelling about its longitudinal axis; means for imparting swivelling motion to one of said parts about its longitudinal axis, including a cam member stationarily mounted on said support and having a cam track, and a cam follower rigidly connected to said one part of each of said arms and tracing said cam track as said carrier rotates about said axis thereof; a plurality of forage-engaging elements attached to the other of said parts of each of said arms; means for mounting said other part of each of said arms on said carrier for displacement between a retracted position corresponding to said windrowing position, in which said forage-engaging elements are spaced a first distance from said axis of said carrier, and an extended position corresponding to said tedding position, in which said forage-engaging elements are spaced a greater second distance from said axis of said carrier; such that said other part extends along a common plane parallel to said axis of said carrier with said one part both in said extended and said retracted position thereof; and cooperating motion-transmitting elements rigid with said parts of each of said arms and in constant contact with one another in and intermediate said retracted and extended positions of said other part of each of said arms and operative for transmitting the swivelling motion of said one part to said other part only in said retracted position of said other part to lift the forage-engaging elements thereof out of engagement with the previously gathered forage at one zone of the orbiting trajectory of said forage-engaging elements about said axis of said carrier and to substantially lower the forage-engaging elements in contact with additional forage at another zone of said trajectory.

2. The machine according to claim 1, wherein said common plane includes said axis of said carrier.

3. The machine according to claim 1, wherein said motion-transmitting elements include a female connecting element rigid with a first of said parts and having an elongated recess, and a male connecting element rigid with a second of said parts and having a projection received in said recess.

4. The machine according to claim 3, wherein said projection is offset from the longitudinal axis of said second part.

5. The machine according to claim 3, wherein said mounting means for said other part of each of said arms includes means for mounting said other parts on said carrier for pivoting about pivoting axes located in a plane substantially normal to said axis of said carrier.

6. The machine according to claim 1, wherein said carrier includes a housing accommodating said motion-transmitting means.

7. The machine according to claim 1, wherein said carrier includes a shield covering said motion-transmitting means from above.

8. A convertible forage-handling machine of the type capable of operating in tedding and windrowing position, comprising a support; at least one carrier mounted on said support for rotation about an axis; a plurality of arms mounted on said carrier for rotation therewith and extending outwardly of said axis, each of said arms including two elongated parts extending along a common plane and each mounted on said carrier at least for swivelling about its longitudinal axis; means for imparting swivelling motion to one of said parts about its longitudinal axis, including a cam member stationarily mounted on said support and having a cam track, and a cam follower rigidly connected to said one part of each of said arms and tracing said cam track as said carrier rotates about said axis thereof; a plurality of forage-engaging elements attached to the other of said parts of each of said arms; means for mounting said other part of each of said arms on said carrier for displacement between a retracted position corresponding to said windrowing position, in which said forage-engaging elements are spaced a first distance from the axis of said carrier, and an extended position corresponding to said tedding position, in which said forage-engaging elements are spaced a greater second distance from said axis of said carrier; and cooperating motion-transmitting elements, including a female connecting element rigid with a first of said parts of each of said arms and having an elongated recess, and a male connecting element rigid with a second of said parts of each of said arms and having a projection offset from the longitudinal axis of said second part and received in said recess and in constant contact therein with said male connecting element, in and intermediate said retracted and extended positions of said other part of each of said arms and operative for transmitting the swivelling motion of said one part to said other part only in said retracted position of said other part to lift said forage-engaging elements thereof out of engagement with the previously gathered forage at one zone of the orbiting trajectory of said forage-engaging elements about said axis of said carrier and to subsequently lower the forage-engaging elements in contact with additional forage at another zone of said trajectory.

9. The machine according to claim 8, wherein said projection is shaped as a body of revolution.

10. A convertible forage-handling machine of the type capable of operating in tedding and windrowing position, comprising a support; at least one carrier mounted on said support for rotation about an axis; a plurality of arms mounted on said carrier for rotation therewith and extending outwardly of said axis, each of said arms including two elongated parts extending along a common plane and each mounted on said carrier at least for swivelling about its longitudinal axis; means for imparting swivelling motion to one of said parts about its longitudinal axis, including a cam member stationarily mounted on said support and having a cam track, and a cam follower rigidly connected to said one part of each of said arms and tracing said cam track as said carrier rotates about said axis thereof; a plurality of forage-engaging elements attached to the other of said parts of each of said arms; means for mounting said other parts of said arms on said carrier for pivoting about respective pivoting axes located in a plane substantially normal to said axis of said carrier between respective retracted positions corresponding to said windrowing position, in which said forage-engaging elements are spaced a first distance from the axis of said carrier, and respective extended positions corresponding to said tedding position, in which said forage-engaging elements are spaced a greater second distance from said axis of said carrier; and cooperating motion-transmitting elements including a female connecting element, rigid with a first of said parts of each of said arms and having an elongated recess, and a male connecting element rigid with a second of said parts of each of said arms and having a projection received in said recess and in constant contact therein with said male connecting element in and intermediate said retracted and extended positions of said other part of each of said arms and operative for transmitting the swivelling motion of said one part to said other part only in said retracted position of said other part to lift said forage-engaging elements thereof out of engagement with the previously gathered forage at one zone of the orbiting trajectory of said forage-engaging elements about said axis of said carrier and to subsequently lower the forage-engaging elements in contact with additional forage at another zone of said trajectory.

11. The machine according to claim 10, wherein each of said pivoting axes is situated intermediate the ends of said other part.

12. The machine according to claim 10, wherein each of said pivoting axis is situated intermediate the ends of said one part.

13. The machine according to claim 10, wherein each of said pivoting axes is situated upwardly of said arm.

14. The machine according to claim 10, wherein said projection extends outwardly of said pivoting axis.

15. The machine according to claim 10, wherein said recess of said female connecting element is curved and centered on said pivoting axis.

* * * * *